Oct. 12, 1943.  R. C. DOUGLAS ET AL  2,331,665
COMBINATION FISHING DEVICE
Filed July 10, 1942   2 Sheets-Sheet 2
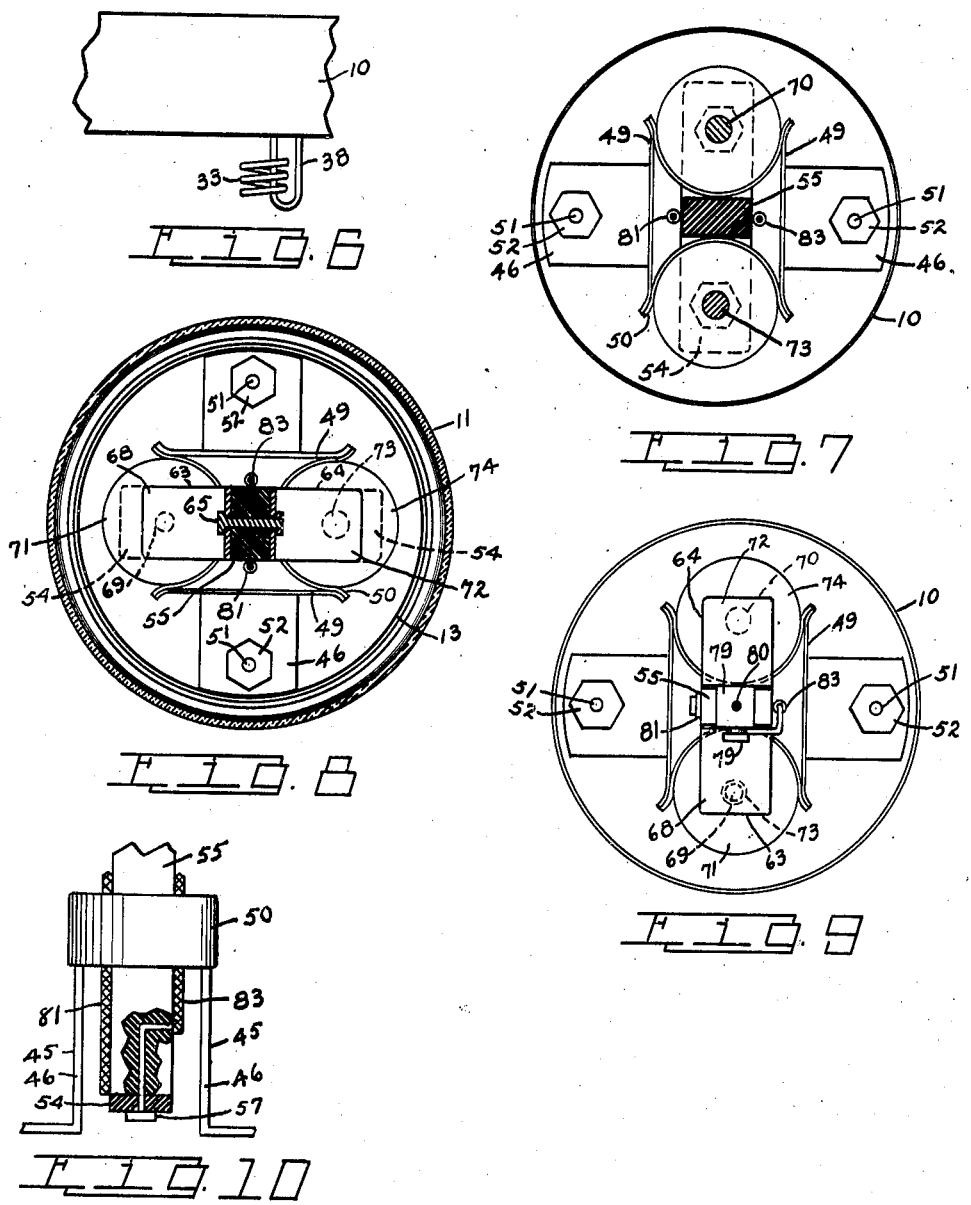
Inventors
RUSSELL C. DOUGLAS
ADOLPH C. WIEBOLD
By Fred C. Geiger
Attorney Patented Oct. 12, 1943

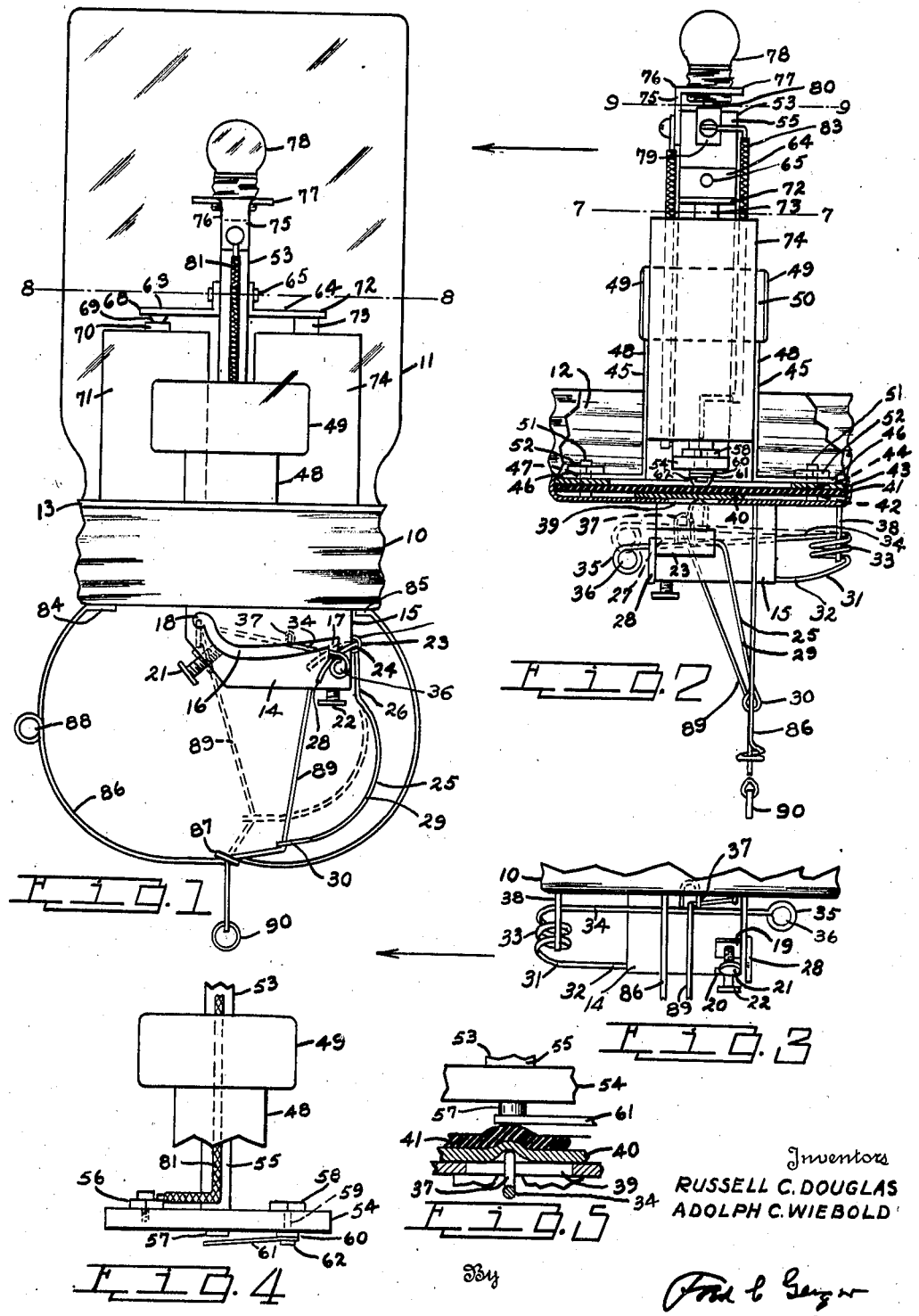

2,331,665

UNITED STATES PATENT OFFICE 2,331,665

COMBINATION FISHING DEVICE

Russell C. Douglas and Adolph C. Wiebold, Kansas City, Mo.

Application July 10, 1942, Serial No. 450,464

6 Claims. (Cl. 43—17)

The present invention relates to a combination fishing device.

It is an object of the present invention to provide a fishing device having an electric bulb and batteries.

Another object of the present invention is the provision of mechanism so arranged that when a fish bites, the jerk automatically closes a circuit and the lamp is illuminated.

A still further object of the present invention is the provision of means for using the device as a lamp.

A still further object of the present invention is the provision of a fishing device that is airtight and vaporproof.

A still further object of the present invention is the provision of a fishing device that may be seen from a great distance.

A still further object of the present invention is the provision of a fishing device that may be seen under water.

These and other objects will hereinafter be more fully explained, reference being had to the accompanying drawings forming a part of this specification and in which like characters apply to like parts throughout the several views.

Figure 1 is an elevational view of the fishing device, and showing the parts set in position for catching fish. The dotted line illustrating the position of the trigger and line when the mechanism is sprung.

Figure 2 is an elevational view looking in the direction of the arrows Figure 1, the body being omitted, the base being broken away, and parts being shown in section; the dotted line illustrating the position of the trigger in released position.

Figure 3 is a fragmentary rear view of the trigger mechanism of Figure 2, and illustrating the movable arm in its normal or released position.

Figure 4 is a view of the contact mechanism, parts being shown fragmentarily.

Figure 5 is an exaggerated fragmentary sectional view of parts in the base and illustrating deformation of the parts when the mechanism is sprung or set off.

Figure 6 is a fragmentary view of the base and illustrating the U-shaped member.

Figure 7 is a sectional view taken on line 7—7 of Figure 2 and illustrating a top view of the clip members.

Figure 8 is a sectional view taken on line 8—8 of Figure 1 and illustrating the bolt securing the L-shaped brackets to a dielectric member.

Figure 9 is a view taken on line 9—9 of Figure 2 and illustrating the contact member on a dielectric member, a portion of another contact member being shown in section.

Figure 10 is an elevational view portions being broken and in section and illustrating the contact member shown in dotted lines in Figure 2, portions being shown fragmentarily.

The present invention comprises a base 10, that engages a body 11 of translucent material, the body having one end open, the peripheral outer wall of the open end being provided with threads that engage female threads 12 in the base. Interposed between the base 10 and the body 11 is a rubber gasket 13 that serves as a water-tight seal to the interior of the body 11. The base is provided with depending walls 14 and 15 that may be integral with the base or rigidly secured to the base in any suitable manner. Within the wall 14 there is provided a slot 16 of irregular configuration, each end of the slot being provided with a notch 17 and 18. The wall 15 is provided with inturned threaded lips 19 and 20 that receive threaded screws 21 and 22 for a purpose to be later described. On the wall 15 there is a rounded portion 23 having a horizontal opening 24.

The trip or trigger of the present invention comprises a length of wire 25 having an upwardly bent portion 26, followed by a horizontal bent portion 27. The horizontal portion 27 engages the opening 24 in the wall 15 for free pivotal movement therein, the portion 28 being bent downwardly and at an angle to the portion 26. The portion 29 of the member 25 is arcuate, the end 30 being formed into an eye. The jerk member of the present invention comprises a single piece of spring wire 31, one arm 32 being rigidly secured to the inner face of the wall 14, the wire being convoluted at 33 serves as a torsional spring fulcrum for a movable arm 34, a portion of the arm engaging the slot 16, the end 35 of the arm 34 being formed into an eye 36. The movable arm 34 carries a U-shaped member 37, and although shown secured to the arm, this U-shaped member may be formed in the arm 34. Depending from the base 10 and rigidly secured thereto is a U-shaped member 38 that serves as an anchoring means for the convolutions 33 and it is to be noted that a portion of the convolutions are engaged by the U-shaped member 38.

The base 10 is provided with an aperture 39 and within the base there is mounted a resilient metal disk 40, a rubber disk 41 having apertures 42, and a metal ring 43 having apertures 44. Superposed upon the ring 43 are spaced brackets 45, the base portion 46 of each bracket being provided with an aperture 47, the vertical portion 48 of each bracket terminating in an oblong portion 49. Transversely of and interposed between the oblong portions are curved clip members 50 of a width equal to the oblong portions and these members serve as a clamping means for a purpose to be later described. The apertures 42, 44 and 47 are in line and they receive a threaded bolt 51, the head of which is fixedly secured to the base 10 in any suitable manner. The members 40, 41, 43 and the base portion 46 of the brackets 45 are held in impinged position in the base by nuts 52 on the bolts 51. Interposed between the vertical portions 48 and the clip members 50, is a dielectric member 53 having a base portion 54 and a vertical portion 55. The base portion 54 is provided with contact members 56, 57 and 58. The contact member 58 is provided with a shank 59, the shank receiving a washer 60, a contact arm 61 and a nut 62. To the vertical portion 55 of the dielectric member 51 there is mounted L-shaped brackets 63 and 64, that are secured to the vertical portion 55 by a bolt 65 that forms a contact between the brackets. The arm 68 of the bracket 63 is provided with a small hump 69 for contact with the carbon or positive element 70 of a dry cell 71. The arm 72 of bracket 64 is provided with an enlarged contact portion 73 for contact with a zinc or negative element of a dry cell 74. To one side of the vertical portion 55 of the dielectric member there is secured one leg 75 of a metal bracket 76, the portion 77 of the bracket having a threaded aperture that receives a light bulb 78. Disposed at right angles to the bracket 75 and secured to the vertical portion 55 there is a contact member 79 that is engaged by the contact 80 of the light bulb 78. The contact member 56 is connected to the metal bracket 76 by wire 81 and the contact member 57 is connected to the contact member 79 by wire 83. The base 10 has fixedly secured thereto the ends 84 and 85 of a bail 86 and it is to be noted that the bail is provided with eyes 87 and 88. Through the eye 87, the eye 30 and the U-shaped member 37 is threaded a line 89, one end of the line being securely fastened to the base 10, the other end being secured to a ring 90.

In the operation of the present device and as illustrated in Figures 1 and 2, a line carrying a hook and sinker (not shown) is secured to the ring 90, the arm 34 is moved in the slot 16 until it reaches the notch 17 where it engages the depending portion 28, the member 25 assuming the position as shown in solid lines in Figure 1. When a fish bites, the jerk exerts a pull on the line, the line pulling the portion 29 towards the eye 87, this movement of the member 25 forces the depending portion 28 upwardly, forcing the arm 34 out of the notch 17, the arm 34 springing upwardly forces the U-shaped member 37 into the aperture 39 and deforms the members 40 and 41, forcing them into contact with the contact arm 61, that engages the contact point 57, closing the circuit and lighting the bulb 78, the bulb remaining lighted until released by hand. The screw 22 serves as an adjustment for the amount of pull required to trip the arm 34. When the device is not in use the screw 21 serves as a stop for the arm 34, thus preventing the U-shaped member from closing the circuit and burning out the batteries. By providing a screw base I provide a means whereby the mechanism may be removed from the body for the purpose of replacing the battery or lamp and such other modifications may be employed as lie within the scope of the appended claims.

Having described our invention in detail in its present preferred embodiment, it will be obvious to those skilled in the art, that various changes and modifications may be made therein without departing from the spirit or scope of the appended claims.

What we claim is:

1. A fishing device comprising a float, an electric signal mounted on the float, a switch controlling the electric signal, a member movable in one direction to close the switch, a spring urging the member in said direction, a trigger releasably securing the member against movement in said direction, said trigger having a portion for engagement by a fish-line whereby a pull exerted on the fish-line will release the trigger, and said movable member being adapted to exert a pull on the fish-line upon release of the trigger.

2. A fishing device comprising a support, an electric light carried by the support, a switch for controlling the light, an arm carried by the support and swingable in one direction to operate the switch, a spring urging the arm in said direction, a trigger releasably holding the arm against movement in said direction, and a fish-line for releasing the trigger, said arm, upon release of said trigger, exerting a pull on the fish-line and operating said light switch.

3. In a fishing device, a base including a flexible diaphragm, a translucent top removably secured to the base to form a water-tight float, electric alarm means mounted on the base including switch means adjacent said diaphragm, an arm carried by the base exteriorly of the float and swingable in one direction into engagement with the flexible diaphragm to operate the switch means, a spring urging the arm in said direction, a trigger releasably holding the arm against movement in said direction, and a fish line for releasing the trigger.

4. In a fishing device, a base including a flexible diaphragm, a translucent top removably secured to the base to form a water-tight float, electric alarm means mounted on the base including switch means adjacent said diaphragm, an arm carried by the base exteriorly of the float and swingable in one direction into engagement with the flexible diaphragm to operate the switch means, a spring urging the arm in said direction, a trigger releasably holding the arm against movement in said direction, a fish line for releasing the trigger, said arm, upon release of said trigger, exerting a pull on the fish line.

5. A fishing device comprising in combination a base and a body, an alarm in said body, support means carried by said base, a movable arm carried by said base and in operative engagement with said support means, deformable means in the base, a contact means carried by said movable arm adapted to contact said deformable means, said deformable means closing an electrical circuit carried in said base and body and controlling said alarm.

6. A fishing device comprising in combination a base and a body, an alarm in said body, support means and actuating means carried by said base, said actuating means comprising a movable arm and a trigger, means carried by said base for positioning said movable arm and trigger in set position, deformable means carried by said base, means carried by said arm adapted to contact said deformable means, said support means when actuated releasing said trigger and movable arm, said means carried by said arm engaging and deforming the deformable means carried by said base, and an electric circuit in said body, said deformable means in said base closing the electrical circuit in said body controlling said alarm.

RUSSELL C. DOUGLAS.
ADOLPH C. WIEBOLD.